(12) United States Patent
Permi et al.

(10) Patent No.: US 9,993,827 B2
(45) Date of Patent: Jun. 12, 2018

(54) METHOD FOR CONTROLLING A MINERAL MATERIAL PROCESSING PLANT AND A MINERAL MATERIAL PROCESSING PLANT

(71) Applicant: Metso Minerals, Inc., Helsinki (FI)

(72) Inventors: Sami Permi, Vesilahti (FI); Juho Tirranen, Tampere (FI); Paavo Nieminen, Kangasala (FI); Juha Konttila, Tampere (FI); Jukka-Pekka Rantanen, Tampere (FI); Kai Yla-Outinen, Pirkkala (FI); Toni Kujala, Tampere (FI)

(73) Assignee: Metso Minerals, Inc., Helsinki (FI)

( * ) Notice: Subject to any disclaimer, the term of this patent is extended or adjusted under 35 U.S.C. 154(b) by 408 days.

(21) Appl. No.: 14/431,493

(22) PCT Filed: Oct. 2, 2013

(86) PCT No.: PCT/FI2013/050954
§ 371 (c)(1),
(2) Date: Mar. 26, 2015

(87) PCT Pub. No.: WO2014/053702
PCT Pub. Date: Apr. 10, 2014

(65) Prior Publication Data
US 2015/0273480 A1      Oct. 1, 2015

(30) Foreign Application Priority Data
Oct. 2, 2012   (FI) ...................................... 20126028

(51) Int. Cl.
*B02C 25/00* (2006.01)
*B07B 13/18* (2006.01)
(Continued)

(52) U.S. Cl.
CPC .............. *B02C 25/00* (2013.01); *B02C 21/02* (2013.01); *B07B 1/42* (2013.01); *B07B 13/16* (2013.01); *B07B 13/18* (2013.01)

(58) Field of Classification Search
CPC ......... B02C 25/00; B02C 21/02; B07B 13/16; B07B 13/18; B07B 1/42
(Continued)

(56) References Cited

U.S. PATENT DOCUMENTS

| 5,664,113 A | 9/1997 | Worger et al. |
| 5,803,376 A * | 9/1998 | Koyanagi ............... B02C 21/02 241/101.74 |

(Continued)

FOREIGN PATENT DOCUMENTS

| CN | 2907896 Y | 6/2007 |
| CN | 102430475 | 5/2012 |

(Continued)

OTHER PUBLICATIONS

Office Action issued in Chinese Patent Application No. 201380051675.2 dated Aug. 2, 2016.
(Continued)

*Primary Examiner* — Faye Francis
(74) *Attorney, Agent, or Firm* — Andrus Intellectual Property Law, LLP

(57) ABSTRACT

A mineral material processing plant and a method for controlling thereof. The mineral material processing plant includes at least one motor, at least one actuator, a feeder device, a control system, and an arrangement for recognizing a need to switch off a standby-mode. The control system is configured to control the processing plant in such a way that the need to switch off a standby mode is automatically recognized. In response to the recognized need to switch off the standby mode the running speed of a motor or motors of
(Continued)

the mineral material processing plant is raised from a stand-by speed (Rsb) to a process speed (Rf); and the feeding of mineral material into the processing plant is enabled.

33 Claims, 5 Drawing Sheets

(51) Int. Cl.
*B02C 21/02* (2006.01)
*B07B 1/42* (2006.01)
*B07B 13/16* (2006.01)

(58) Field of Classification Search
USPC .......................................................... 241/36
See application file for complete search history.

(56) References Cited

U.S. PATENT DOCUMENTS

| | | | |
|---|---|---|---|
| 7,147,175 B2* | 12/2006 | Ikegami | B02C 21/026 241/35 |
| 7,318,463 B2* | 1/2008 | Tanaka | B02C 21/026 144/36 |
| 8,583,322 B2* | 11/2013 | Yamaguchi | B02C 21/026 144/36 |
| 2003/0004624 A1 | 1/2003 | Wilson et al. | |
| 2007/0034295 A1 | 2/2007 | Chapman | |
| 2008/0051243 A1 | 2/2008 | Raney | |
| 2009/0294559 A1 | 12/2009 | Eriksson et al. | |
| 2011/0077821 A1* | 3/2011 | Yamaguchi | B02C 21/026 701/36 |
| 2011/0089270 A1 | 4/2011 | Juha et al. | |

FOREIGN PATENT DOCUMENTS

| | | | |
|---|---|---|---|
| EP | 1199680 A | | 4/2002 |
| GB | 2358506 A | | 7/2001 |
| JP | H03-12244 B2 | | 2/1991 |
| JP | 2000 136739 A | | 5/2000 |
| JP | 2003 170076 A | | 6/2003 |
| JP | 2004 261758 A | | 9/2004 |
| JP | 2004-261758 A | | 9/2004 |
| JP | 2005 205365 A | | 8/2005 |
| JP | 2008-511070 A | | 4/2008 |
| JP | 2011-050949 A | | 3/2011 |
| WO | 02097738 A1 | | 12/2002 |

OTHER PUBLICATIONS

Search Report Issued in Chinese Patent Application No. 201380051675.2 dated Jul. 25, 2016.
PCT International Search Report and Written Opinion dated Nov. 27, 2014.
Search Report issued in Finnish priority Application No. 20126028 dated Jul. 9, 2013.
Office Action and Supplementary Search Report for Chinese Patent Application No. 201380051675.2 dated Sep. 21, 2017.
Office Action issued by the Japanese Patent Office for Japanese Patent Application No. 2015-533654 dated Sep. 14, 2017.
International Search Report for PCT/US2005/021389 dated Jun. 12, 2005.

* cited by examiner

METHOD FOR CONTROLLING A MINERAL MATERIAL PROCESSING PLANT AND A MINERAL MATERIAL PROCESSING PLANT

CROSS-REFERENCE TO RELATED APPLICATIONS

This application claims priority to PCT/FI2013/050954, filed Oct. 2, 2013, and published in English on Apr. 10, 2014 as publication number WO 2014/053702, which claims priority to FI Application No. 20126028, filed Oct. 2, 2012, incorporated herein by reference.

FIELD OF INVENTION

The invention relates to a method for controlling a mineral material processing plant and to a mineral material processing plant. In particular, but not exclusively, the invention relates to a mobile mineral material processing plant and to controlling thereof.

BACKGROUND OF THE INVENTION

Mineral material, such as stone, is retrieved to be crushed from the ground either by exploding or by digging. Mineral material may also comprise natural stone, gravel and construction waste. Both mobile crushers and fixed crusher applications are used for crushing. The material to be crushed is fed with an excavator or a wheel loader into a feed hopper of the crusher, from where the material to be crushed falls into the jaws of the crusher, or a feeder or a feeder device transfers the stone material towards the crusher.

A mineral material processing plant comprises on or more crushers and/or screens and possibly further devices such as conveyors. The processing plant may be fixed or mobile. In particular mobile processing plants are used in urban surroundings in processing recyclable material such as construction waste.

It is endeavored to utilize the capacity of a processing plant economically fully in such a way that the crusher is loaded continuously with a large crushing power and the used crushing power is directed to producing a planned product distribution. Interruptions of the crushing event reduce efficiency and crushing time. Also the staring of a processing plant is a time consuming task which further hinders the efficient utilization of the capacity of the plant.

An objective of the invention is to provide a mineral material processing plant the bringing of which into process run is easy, fast and safe. An objective of the invention is to provide a processing plant that can be kept running energy-economically. An objective of the invention is to enable a crushing or other processing time as long as possible.

SUMMARY

According to a first aspect of the invention there is provided a method for controlling a mineral material processing plant, the method comprising
  automatically recognizing a need to switch off a standby mode;
  in response to the recognized need to switch off the standby mode raising the running speed of a motor or motors of the mineral material processing plant from a stand-by speed to process speed; and
  enabling the feeding of mineral material into the processing plant.

Preferably the need to switch off the stand-by mode is recognized by recognizing mineral material on a feeder device of the mineral material processing plant.

Preferably the need to switch off the stand-by mode is recognized by recognizing mineral material arriving to be processed.

Preferably the mineral material on the feeder device is recognized by measuring the surface height of the mineral material on the feeder device of the mineral material processing plant Preferably the surface height of the mineral material on the feeder device of the mineral material processing plant is measured with an ultrasound sensor, an optical sensor and/or a radiation sensor.

Preferably the mineral material on the feeder device is recognized by measuring the tension, force and/or pressure caused to the feeder device by the mineral material.

Preferably the tension, force and/or pressure caused to the feeder device by the mineral material is measured with strain gauges, conveyor scale and/or pressure sensor.

Preferably the mineral material on the feeder device is recognized from a video with image based measurement.

Preferably the mineral material arriving to be processed is recognized by recognizing the proximity to the feeder device of the mineral material processing plant of a machine or of a part of the machine used to bring the mineral material.

Preferably, the proximity to the feeder device of the mineral material processing plant of a machine or a part of the machine is recognized by reading an identifier positioned in the machine or in the part of the machine.

Preferably, the proximity to the feeder device of the mineral material processing plant of a machine or a part of the machine is recognized by reading a radio frequency identification, RFID, identifier positioned in the machine or in the part of the machine.

Preferably, the proximity to the feeder device of the mineral material processing plant of a machine or a part of the machine is recognized by satellite positioning.

Preferably, the proximity to the feeder device of the mineral material processing plant of a machine or a part of the machine is recognized from a video with image based measurement.

Preferably the mineral material arriving to be processed is recognized based on measurement information received from an earlier processing phase.

Preferably the mineral material arriving to be processed is recognized by recognizing an identifier placed among the mineral material.

Preferably prior to enabling the feeding of mineral material into the processing plant, the mineral material on the feeder device of the mineral material processing plant is recognized, and the feeding of mineral material into the processing plant is enabled in response to recognizing the mineral material on the feeder device of the mineral material processing plant.

According to a second aspect of the invention there is provided a mineral material processing plant comprising
  at least one motor;
  at least one actuator;
  a feeder device; and
  a control system;
  an arrangement for recognizing a need to switch off a standby-mode; in which processing plant
  the control system is configured to control the processing plant according to a method according to the first aspect of the invention.

Preferably the processing plant comprises a crusher and/or a screen.

Preferably the processing plant is one of the following; a fixed plant, a track-based plant, a wheel-based plant.

Preferably the arrangement for recognizing the need to switch off a standby-mode comprises an arrangement for recognizing mineral material on the feeder device.

Preferably the arrangement for recognizing the need to switch off a standby-mode comprises an arrangement for recognizing material arriving to be processed.

Preferably the arrangement for recognizing mineral material on the feeder device comprises an arrangement for measuring the surface height of the material on the feeder device.

Preferably the arrangement for measuring the surface height of the material on the feeder device comprises an ultrasound sensor, an optical sensor and/or a radiation sensor.

Preferably the arrangement for recognizing mineral material on the feeder device comprises an arrangement for measuring the tension, force and/or pressure caused to the feeder device by the mineral material.

Preferably the arrangement for measuring the tension, force and/or pressure caused to the feeder device by the mineral material comprises strain gauges, a conveyor scale and/or a pressure sensor.

Preferably the arrangement for recognizing mineral material on the feeder device comprises an arrangement for recognizing mineral material on the feeder device from a video with image based measurement.

Preferably the arrangement for recognizing material arriving to be processed comprises an arrangement for recognizing the proximity to the feeder device of the mineral material processing plant of a machine or of a part of the machine used to bring the mineral material.

Preferably the arrangement for recognizing the proximity to the feeder device of the mineral material processing plant of a machine or of a part of the machine used to bring the mineral material comprises an arrangement for reading an identifier positioned in the machine or in the part of the machine.

Preferably the identifier positioned in the machine or in the part of the machine comprises a radio frequency identification, RFID, identifier.

Preferably the arrangement for recognizing the proximity to the feeder device of the mineral material processing plant of a machine or of a part or the machine used to bring the mineral material comprises a recognition arrangement based on satellite positioning.

Preferably the arrangement for recognizing the proximity to the feeder device of the mineral material processing plant of a machine or of a part of the machine used to bring the mineral material comprises a recognition arrangement with image based measurement from a video image.

Preferably the arrangement for recognizing the proximity to the feeder device of the mineral material processing plant of a machine or of a part of the machine used to bring the mineral material comprises an arrangement for recognizing the material arriving to be processed based on measurement information received from an earlier processing phase.

Preferably the arrangement for recognizing material arriving to be processed comprises an arrangement for recognizing an identifier placed among the mineral material arriving to be processed.

According to a third aspect of the invention there is provided a control system for controlling a mineral material processing plant, the control system being configured to control a processing plant according to a method according to a first aspect of this invention.

According to a fourth aspect of the invention there is provided a computer program comprising computer executable program code that when executed causes a computer to execute a method according to a first aspect of this invention.

Different embodiments of the present invention will be illustrated or have been illustrated only in connection with some aspects of the invention. A skilled person appreciates that any embodiment of an aspect of the invention may apply to the same aspect of the invention and other aspects alone or in combination with other embodiments as well.

BRIEF DESCRIPTION OF THE DRAWINGS

The invention will now be described, by way of example, with reference to the accompanying drawings, in which.

DETAILED DESCRIPTION

In the following description, like numbers denote like elements. It should be appreciated that the illustrated figures are not entirely in scale, and that the figures mainly serve the purpose of illustrating embodiments of the invention.

Figure 1:
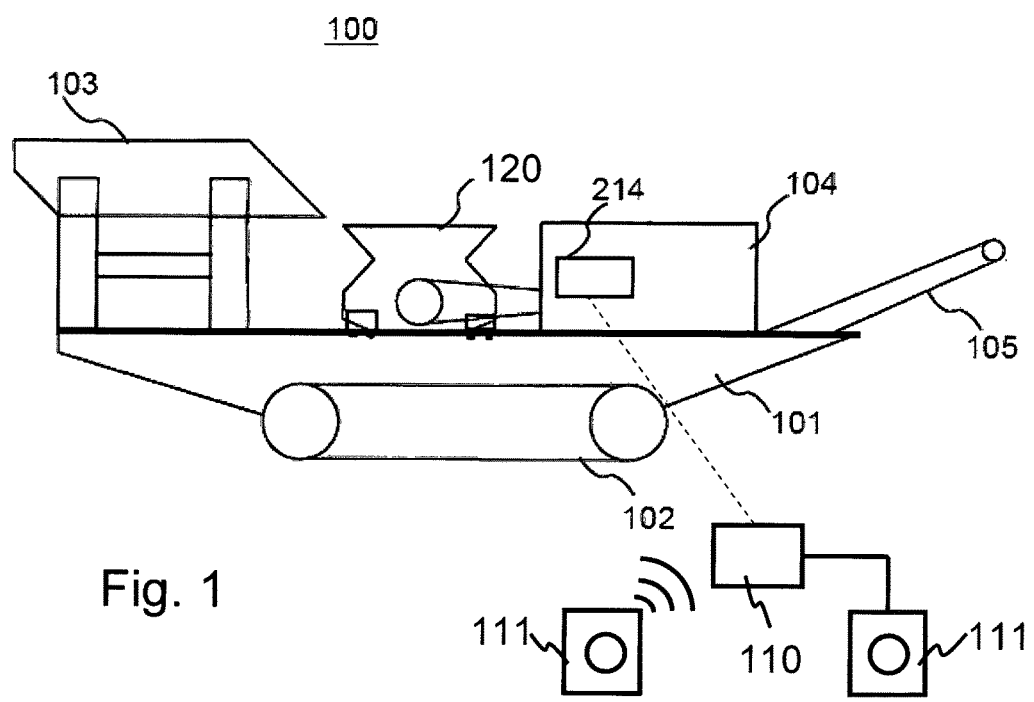
FIG. 1 shows a side view of a mineral material processing plant according to a preferred embodiment of the invention.

FIG. 1 shows a mobile track based mineral material processing plant 100 according to a preferred embodiment of the invention. Also the terms processing plant and crushing plant will be used hereinafter for the mineral material processing plant 100. Processing plant 100 comprises a frame 101, a track-base 102, a feeder 103 and a crusher 120, such as a cone-, jaw- or gyratory crusher. The crushing plant 100 further comprises a motor unit 104 for driving the crusher 120 and a conveyor for conveying the crushed material for example into a pile. The crusher 120 may be used as intermediate or post processing crusher. In particular crusher 120 may be used in fine crushing. The mobile crushing plant 100 may be movable also with other means, such as wheels, skids or legs. The crushing plant 100 may also be fixed. The feeder 103 may be of type of vibration feeder or a belt- or a lamella conveyor.

The crushing plant 100 further comprises a control system 214 and a control unit 110 with which the crushing plant may be driven into a stand-by mode. The control unit 110 is in FIG. 1 shown separately from control system 214 for the sake of clarity, but the control unit 110 may be integrated into the control system 214. The crushing plant 100 further comprises manual operating switches 111 and 111' for the stand-by mode, which switches are connected to the control unit 110 either wirelessly or with a fixed connection. Alternatively, there is only one operating switch. The operating switch 111,111' may be arranged in such a way that it may be used either with a fixed or with a wireless connection. With the stand-by mode operating switches 111,111' the crushing plant may be automatically driven to a stand-by mode and back to the process mode from the stand-by mode with a single push, or a like operating, of the switch. Driving the crushing plant to the stand-by mode or returning to the process mode by actuating the operating switch 111,111' requires a user of the crushing plant to evaluate the need for a change of mode and to manually engage the change of the mode.

According to a preferred embodiment of the invention the control unit 110 or the control system 214 comprises an arrangement with which the crushing plant 100 may be driven to process mode, i.e. returned from the stand-by mode automatically in a way hereinafter described. The control unit 110 or the control system 214 comprises, or is in connection with, the sensors and/or the like measurement arrangements used for the arrangement.

Figure 2:
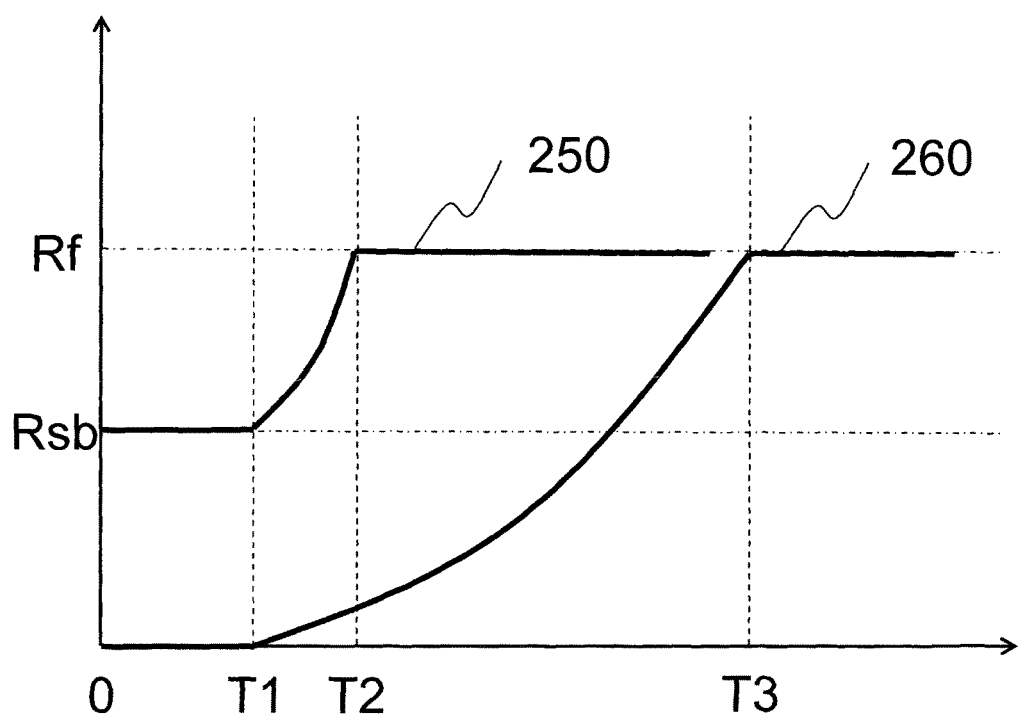
FIG. 2 shows the functioning of actuators of a mineral material processing plant according to a preferred embodiment of the invention with rotating speed.

FIG. 2 shows the functioning of the actuators of a mineral material processing plant 100 according to a preferred embodiment controlled by a method according to a preferred embodiment with the rotating speed of the motors(s) 104. The Fig. shows with a chart the driving of the crushing plant 100 into process speed after an interruption 260 and driving of the crushing plant 100 automatically into process speed from a stand-by mode according to a preferred embodiment 250. The vertical axis of the chart shown in FIG. 2 shows a rotating speed of an actuator or actuators and the horizontal axis shows time.

During an interruption at the time 0 . . . T1 the actuators of the crushing plant 100 are stopped and the motor 104 used to drive the plant is also stopped. Alternatively the motor 104 used to drive the crushing plant may run on idle speed while actuators anyhow remain stopped. According to an example embodiment the motor 104 is a diesel motor or an electric motor.

In starting up the crushing plant 100, the actuators need to be started up gradually in a certain sequence. In addition, each actuator has a rise time of its own that is required prior to said actuator reaching its process speed. Process speed means the speed of the actuator which speed the actuator has when the crushing plant 100 is in process mode or process use, i.e. when the crushing plant 100 processes material and in which state the motor 104 of the crushing plant 100 is running with process speed Rf.

Also official rules control the starting of the crushing plant 100. For example, prior to starting, an alarm sound needs to be sounded and a certain waiting period needs to be reserved prior to starting the actuators for ensuring safety, Typically a crushing plant 100 comprises more than one actuator, and depending on the purpose and composition of the crushing plant 100 there may be for example 12 or more actuators. As an example, actuators belonging to the composition of a crushing plant 100 are various conveyors, such as main conveyor and side conveyor; a conveyor with magnet for separating metal; a screen; a water pump; and a crusher. Due to the number of actuators, the starting sequence as hereinbefore explained and issues related thereto, the driving of the crushing plant 100 to the process speed takes a certain time depending on the composition of the plant, as can be seen from the chart 500 of FIG. 2. The time needed for start T1 . . . T3 may be several minutes.

The time needed for start T1 . . . T3 further causes the driving of the crushing plant 100 with process speed also when material to be processed is not fed into the crushing plant 100, especially if the time during which no material to be processed is fed is short. Continuous driving with process speed increases energy consumption, noise production and exposes components or me crushing plant 100 to wear.

Respectively, when using a manual operating switch 111, 111' by engaging which a user of the crushing plant drives the crushing plant into stand-by mode and back to process mode, the crushing plant might be driven with process speed also when material to be processed is not fed into the crushing plant 100, especially if the time during which no material to be processed is fed is short.

Instead of an interruption the crushing plant 100 may be driven into stand-by mode. Stand-by mode means a state in which substantially all chosen actuators of the crushing plant 100 remain running at a reduced stand-by speed, or stand-by mode speed, or reduced power. Hereinafter this reduced speed is called stand-by speed. The stand-by speed may be different for each actuator, and such a speed that each actuator remains running. Here by substantially all actuators remain running means that actuators substantially relating to the crushing process, i.e. actuators directly in touch with mineral material processing, remain mainly running in such a way that their driving to process speed is quickened. However, a part of the actuators of the crushing plant 100 is stopped in stand-by mode, for example a feeder or a feed conveyor may be stopped completely in order to prevent feeding as hereinafter described. Furthermore, in some example embodiments, also some actuators, for example cooling devices and pumps, need to be used with process speed also in stand-by mode. In stand-by mode the motor 104 of the crushing plant 100 runs at stand-by speed Rsb that may be for example the idle speed of motor 104 or a further speed other than that and smaller than process speed Rf. The crushing plant 100 may have several stand-by speeds different from each other, which are chosen for example in accordance with prevailing conditions such as weather, to which belongs e.g. temperature moisture and wind speed, or the location of the crushing plant. The desired actuators that remain running with stand-by speed may be chosen by a user or automatically beforehand. In an example embodiment, the choice may also be dependent on prevailing conditions and the composition of the processing plant 100.

In stand-by mode, the feeding of the material into the processing plant 100 is limited for example by stopping a feeder or feed conveyor or by choosing a stand-by speed in such a way that the feeder or feed conveyor is unable to feed material into the crushing plant. By limiting, or completely preventing, the feeding, damaging or blocking of actuators that could result from material ending up in a crushing plant 100 running on stand-by speed, is avoided.

When driving the crushing plant 100 into process speed Rf from the stand-by speed Rsb may substantially all actuators be accelerated simultaneously so that the process speed Rf is reached in a significantly shorter time T1 . . . T2 compared to a start after an interruption. Change from stand-by speed Rsb to process speed Rf may last for example some seconds. It should be noted that respectively the change from process speed Rf to stand-by speed Rsb requires a significantly shorter time than change from process speed Rf to an interruption.

In the stand-by mode the energy consumption of the crushing plant 100 is significantly smaller than in the process mode. The energy consumption may for example be 50% lower in the stand-by than in the process mode. IN the stand-by mode also the noise level of the crushing plant 100 is lowered. The stand-by mode allows energy saving compared to continuous running at process speed for example in extremely cold conditions in which the crushing plant 100 needs to be kept running continuously in order to avoid damaging the crushing plant or disturbance to the functioning thereof. The stand-by mode ensures that the processing plant 100 stays warm in cold conditions also at lowered stand-by speed. For example the hydraulic oil used and various lubricants may be kept at proper temperature also with stand-by speed. In said cold conditions the stand-by mode may be utilized also for ice prevention of the conveyors of the crushing plant 100.

The lower noise level of the stand-by mode also allows the effective usage time of the crushing plant 100 to be increased for example in conditions in which the cumulative amount of noise produced by the crushing plant 100 is limited for example in accordance with official orders. Such usage situation occur increasingly for example in crushing recyclable material such as material from demolished buildings in urban environment.

The stand-by mode has been found to improve the safety of the crushing plant 100. Rotating and moving actuators are easier to notice and thus avoid getting in contact with them. Especially in combination with start after an interruption may an actuator of the crushing plant 100 start surprisingly, if for example the alarm sound signaling the starting has been ignored or the actuator in question starts at a late phase of the starting sequence, for example several minutes after the alarm sound or giving the starting command.

The stand-by mode may also be utilized in carrying out adjustments of certain actuators of the crushing plant 100. For example the jaws of a jaw crusher may be adjusted during stand-by mode or the regeneration of a potential diesel motor can be carried out during stand-by mode instead of an interruption. Also the position of the crushing plant 100 may be fine-tuned in stand-by mode.

According to an embodiment of the invention, the change from stand-by mode to the process mode takes place automatically without a user of the crushing plant 100 having to carry out any action. According to a preferred embodiment, the automatic transfer from stand-by mode to process mode takes place in response to detecting a need to switch off the stand-by mode, for example when mineral material to be processed is detected to be available or becoming available. The automatic transfer from stand-by mode to process mode can be utilized in such a way that the mineral material processing plant functions with process speed Rf at once, when mineral material to be processed is available, but the change from stand-by mode to process mode need not happen so early that the mineral material processing plant would function in process mode extra periods when no mineral material to be processed is available.

Figure 3:
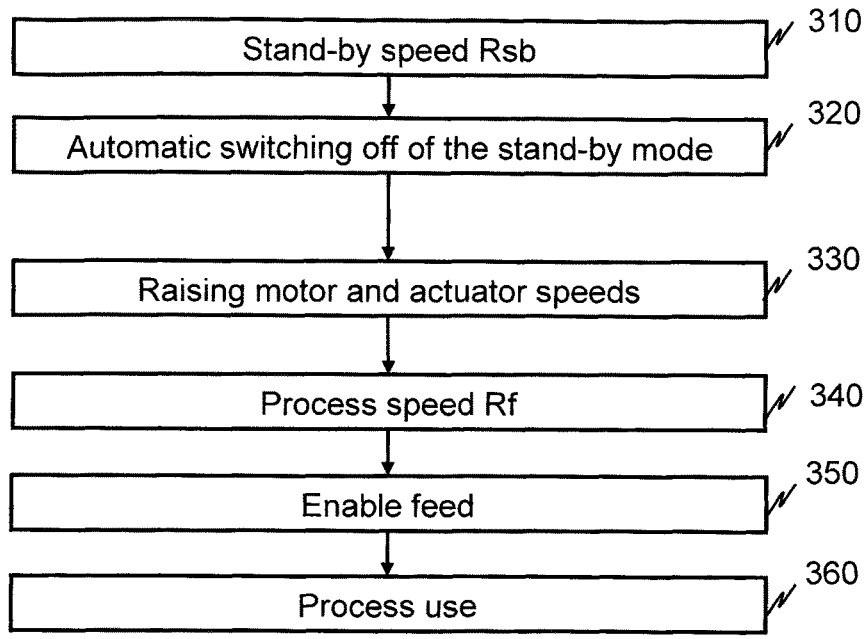
FIG. 3 shows a flow chart of a preferred embodiment of the invention.

FIG. 3 shows a flow chart of a preferred embodiment of the invention. At the beginning 310 the crushing plant is driven with stand-by speed Rf.

At step 320 the stand-by mode is automatically switched off as certain conditions are fulfilled, when a need to switch off is recognized as described hereinafter. The control unit 110 or control system 214 is arranged in such a way that switching of the stand-by mode, i.e. change from stand-by mode to process mode 330,340,350 is carried out automatically.

At step 330 the rotating speed of motor(s) and actuators is raised until the process speed Rf is reached 340. After this the feeding of material into the crushing plant 100 is again enabled at step 350, for example by turning on the actuators participating in the feeding and the operation of the crushing plant 100 continues in process mode.

Figure 4:
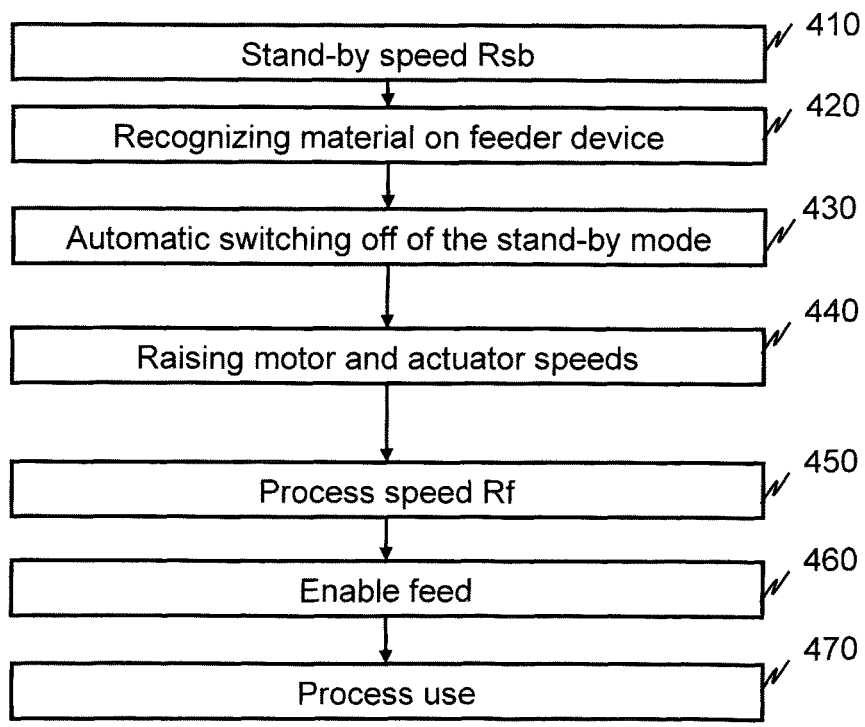
FIG. 4 shows a flow chart of a preferred embodiment of the invention.

FIG. 4 shows a flow chart of a preferred embodiment of the invention. At the beginning 410 the crushing plant is driven with stand-by speed Rf.

At step 420 material to be processed is recognized on the feeding device, i.e. it is noticed that mineral material is available to be processed. In a preferred embodiment, the material on the feeding device is recognized with a surface switch, for example an ultrasound sensor, optical sensor, radiation sensor or the like. Further, according to an example embodiment the material on the feeding device is recognized by measuring the pressure, force or tension caused on the feeding device for example with a conveyor scale, strain gauges or the like. Further, according to an example embodiment the material on the feeding device may be recognized from video image or the like with image based measurement. A skilled person appreciates that a further common measurement arrangement and/or a combination of several different measurement arrangements may be used to recognize the material on the feeding device. The recognition- or measurement information received from the feeding device is relayed to the control unit 110 and/or control system 214 that in response to the received recognition of material on the feeding device starts the switching off of the stand-by mode 430. The control unit 110 or control system 214 is arranged in such a way that switching of the stand-by mode, i.e. change from stand-by mode to process mode 440,450, 460 is carried out automatically.

At step 440 the rotating speed of motor(s) and actuators is raised until the process speed Rf is reached 450. After this the feeding of material into the crushing plant 100 is again enabled at step 460, for example by turning on the actuators participating in the feeding and the operation of the crushing plant 100 continues in process mode 470.

Figure 5:
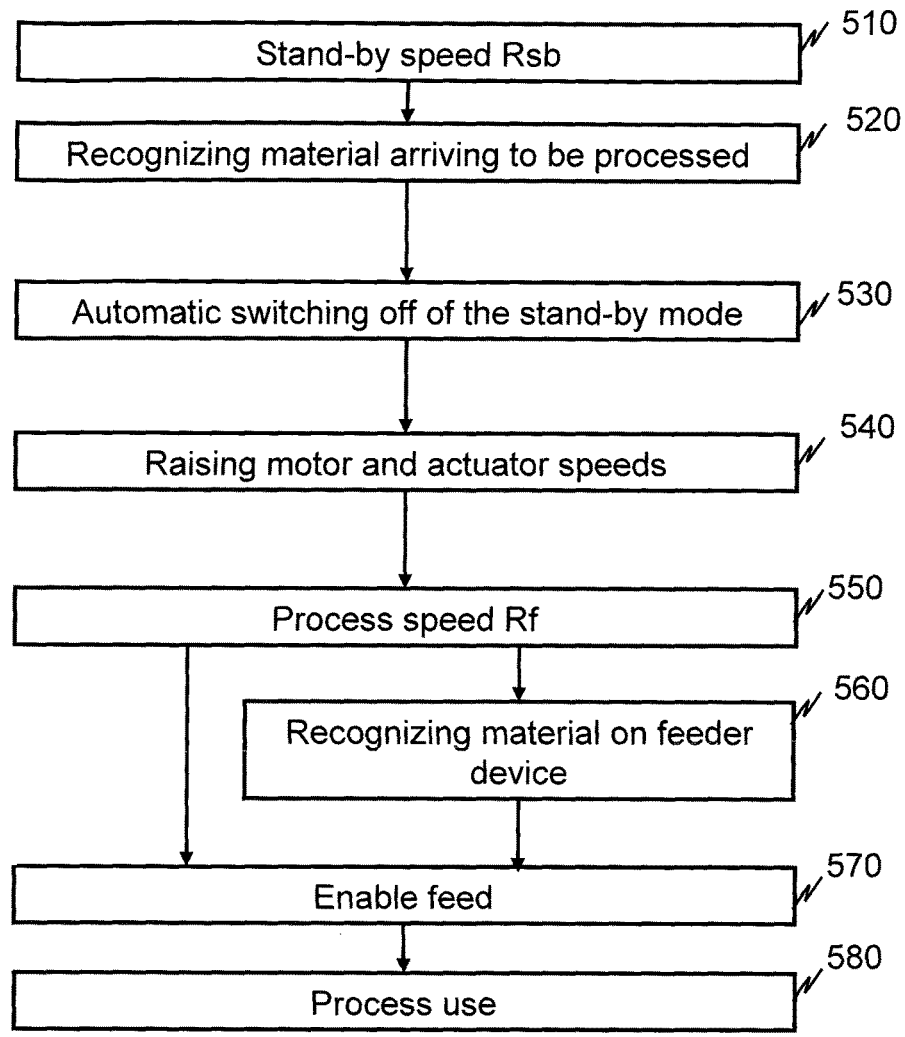
FIG. 5 shows a flow chart of a preferred embodiment of the invention.

FIG. 5 shows a flow chart of a preferred embodiment of the invention. At the beginning 510 the crushing plant is driven with stand-by speed Rf.

At step 520 material arriving to be processed is recognized, i.e. it is noticed that mineral material is, if not at once but after a certain time, available to be processed, and so the stand-by mode can be switched off in preparation so that when the material has arrived on the feeding device, the processing can be started without delay.

According to a preferred embodiment, the mineral material arriving to be processed is recognized by recognizing the proximity to the feeder device of the mineral material processing plant of a machine or of a part of the machine used to bring the mineral material. The machine or apart of the machine to be recognized may for example be an excavator, the scoop of an excavator, a wheel loader or the like. For recognizing the proximity, nearing of or position of the machine or a part of a machine is, in a preferred embodiment, used for example radio frequency identification (RFID) identifier that has been placed at a suitable position of the machine or a part of the machine. In such a case a reader or the like is placed on the mineral material processing plant or in proximity thereof and connected to the control unit 110 and/or control system 214. The reader recognizes the proximity to the feeder device of a machine used to bring the material by reading the rfid-identifier.

Further, according to a preferred embodiment, for recognizing the proximity, nearing of or position of the machine or a part of a machine global positioning system (GPS) technology or a like satellite positioning technology, other positioning technology, image based measurement from a video image or the like, or a further proximity switch, -sensor, or like measurement is used.

According to a preferred embodiment, the material to be processed may be recognized by utilizing information material arriving to be processed available in the control system 214. A mineral material processing plant may for example comprise several crushers and/or screens in which case according to a preferred embodiment, measurement information from a previous processing phase is used to recognize material arriving to be processed, for example measurement information that material from pre-crusher is arriving to the next process phase. Further, according to a preferred embodiment, measurement information on material flows of different processing phases of the mineral material processing plant is used to recognize material arriving to be processed.

According to a preferred embodiment, material arriving to be processed is recognized by placing identifiers among the material to be processed, for example RFID-identifiers, the proximity of which a reader or the like positioned on the mineral material processing plant or in proximity thereof recognizes.

A skilled person appreciates that also a combination of several recognition methods may be used to recognize the material arriving to be processed.

The recognition- or measurement information received is relayed to the control unit 110 and/or control system 214 that in response to the received recognition of material arriving to be processed starts the switching off of the stand-by mode 530. The control unit 110 or control system 214 is arranged in such a way that switching of the stand-by mode, i.e. change from stand-by mode to process mode 540-580 is carried out automatically.

At step 540 the rotating speed of motor(s) and actuators is raised until the process speed Rf is reached 550. After this the feeding of material into the crushing plant 100 is again enabled at step 570, for example by turning on the actuators participating in the feeding. According to a preferred embodiment, prior to enabling feeding at step 570, the material on the feeding device is recognized as hereinbefore described, so that feeding is not enabled before the previously recognized material arriving to be processed is on the feeding device. At step 580 the operation of the crushing plant 100 continues in process mode.

Figure 6:
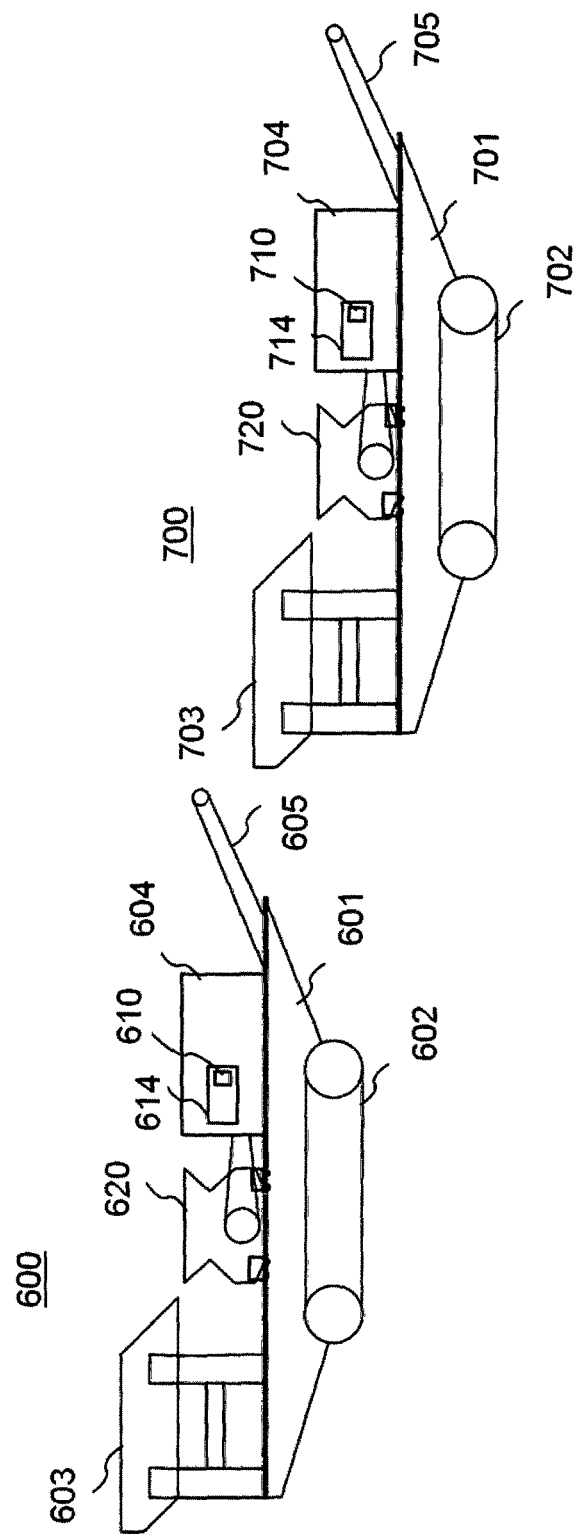
FIG. 6 shows a side view of a mineral material processing plant according to a preferred embodiment of the invention.

FIG. 6 shows a mineral material processing plant according to a preferred embodiment of the invention which mineral material processing plant in way of an example comprises two crushing plants 600,700. The mineral material processing plant may also comprise more crushing plants and/or screens in different compositions and combinations. The crushing plants 600,700 comprise a frame 601,701, a track base 602,702, a feeder 603, 703 and a crusher 620,720, such as a cone-, jaw, or gyratory crusher unit. The crushing plants 600,700 further comprise a motor unit 604,704 for driving the crusher 620,720 and a conveyor 605,606 for conveying the crushed material for example to the next crusher, screen or to a pile. The crushing plants 600,700 may be used for example as intermediate or post processing crusher or in fine crushing. The crushing plants 600,700 may be movable also with other means, such as wheels, skids or legs. The crushing plants 600,700 may also be fixed. The feeder or feeder device 603,703 may be of type of vibration feeder or a belt- or a lamella conveyor.

The mineral material processing plant and/or on ore more crushing plant 600,700 further comprises a hereinbefore described control system 614,714 and a control unit 610,710 with which the mineral material processing plant or one or more crushing plant 610,710 may be automatically driven from a stand-by mode to a process mode as hereinbefore described according to embodiments of the invention. According to an example embodiment, the control systems of separate crushing plants 600,700 of the mineral material processing plant are in connection with each other or have been realized as a single system.

Without in any way limiting the scope of protection, interpretation or possible applications of the invention, a technical advantage of different embodiments of the invention may be considered to be a decrease of energy consumption and noise production of a mineral material processing plant. Further, a technical advantage of different embodiments of the invention may be considered to be a lengthening of the lifetime of components of a mineral material processing plant. Further, a technical advantage of different embodiments of the invention may be considered to be an increase of environmental friendliness of a mineral material processing plant. Further, a technical advantage of different embodiments of the invention may be considered to be an improvement in the safety and working ergonomics of a mineral material processing plant. Further, a technical advantage of different embodiments of the invention may be considered to be increasing the number of effective usage hours of a mineral material processing plant.

The foregoing description provides non-limiting examples of some embodiments of the invention. It is clear to a person skilled in the art that the invention is not restricted to details presented, but that the invention can be implemented in other equivalent means. Some of the features of the above-disclosed embodiments may be used to advantage without the use of other features.

As such, the foregoing description shall be considered as merely illustrative of the principles of the invention, and not in limitation thereof. Hence, the scope of the invention is only restricted by the appended patent claims.

The invention claimed is:

1. A method for controlling a mineral material processing plant, characterized in that the method comprises:
   operating the mineral material processing plant in a standby mode in which feeding of mineral material into the mineral material processing plant is prevented;
   automatically recognizing a need to switch out of the standby mode and into a process mode;
   in response to the recognized need to switch out of the standby mode and into the process mode, raising the running speed of a motor or motors of the mineral material processing plant from the stand-by speed to a process speed; and
   enabling the feeding of mineral material into the processing plant in the process mode.

2. The method of claim 1, characterized in that the need to switch out of the stand-by mode is recognized by recognizing mineral material on a feeder device of the mineral material processing plant.

3. The method of claim 1, characterized in that the need to switch out of the stand-by mode is recognized by recognizing mineral material arriving to be processed.

4. The method of claim 2, characterized in that the mineral material on the feeder device is recognized by measuring a surface height of the mineral material on the feeder device of the mineral material processing plant.

5. The method of claim 4, characterized in that the surface height of the mineral material on the feeder device of the mineral material processing plant is measured with one of an ultrasound sensor, an optical sensor and/or a radiation sensor.

6. The method of claim 2, characterized in that the mineral material on the feeder device is recognized by measuring one of tension, force and/or pressure caused to the feeder device by the mineral material.

7. The method of claim 6, characterized in that the tension, force and/or pressure caused to the feeder device by the mineral material is measured with one of strain gauges, conveyor scale and/or pressure sensor.

8. The method of claim 2, characterized in that the mineral material on the feeder device is recognized from a video with image based measurement.

9. The method of claim 3, characterized in that the mineral material arriving to be processed is recognized by recognizing a proximity to the feeder device of the mineral material processing plant of a machine or of a part of the machine used to bring the mineral material.

10. The method of claim 9, characterized in that the proximity to the feeder device of the mineral material processing plant of the machine or the part of the machine is recognized by reading an identifier positioned in the machine or in a part of the machine.

11. The method of claim 10, characterized in that the proximity to the feeder device of the mineral material processing plant of the machine or the part of the machine is recognized by reading a radio frequency identification, RFID, identifier positioned in the machine or in the part of the machine.

12. The method of claim 9, characterized in that the proximity to the feeder device of the mineral material processing plant of the machine or the part of the machine is recognized by satellite positioning.

13. The method of claim 9, characterized in that the proximity to the feeder device of the mineral material processing plant of the machine or the part of the machine is recognized from a video with image based measurement.

14. The method of claim 3, characterized in that the mineral material arriving to be processed is recognized based on measurement information received from an earlier processing phase.

15. The method of claim 3, characterized in that the mineral material arriving to be processed is recognized by recognizing an identifier placed among the mineral material.

16. The method of claim 3, characterized in that prior to enabling the feeding of mineral material into the processing plant, the mineral material on a feeder device of the mineral material processing plant is recognized, and the feeding of mineral material into the processing plant is enabled in response to recognizing the mineral material on the feeder device of the mineral material processing plant.

17. A mineral material processing plant, comprising:
at least one motor;
at least one actuator;
a feeder device; and
a control system;
characterized in that the processing plant further comprises
an arrangement for recognizing a need to switch out of a standby-mode and into a process mode;
in which processing plant the control system is configured to control the processing plant by:
operating the mineral material processing plant in the standby mode in which feeding of mineral material into the mineral material processing plant is prevented;
automatically recognizing a need to switch out of the standby mode and into the process mode;
in response to the recognized need to switch out of the standby mode, raising the running speed of a motor or motors of the mineral material processing plant from a stand-by speed to a process speed; and
enabling the feeding of mineral material into the processing plant in the process mode.

18. The mineral material processing plant of claim 17, characterized in that the processing plant comprises a crusher and/or a screen.

19. The mineral material processing plant of claim 17, characterized in that the processing plant is one of the following; a fixed plant, a track-based plant, a wheel-based plant.

20. The mineral material processing plant of claim 17, characterized in that the arrangement for recognizing the need to switch out of a standby-mode comprises an arrangement for recognizing mineral material on the feeder device.

21. The mineral material processing plant of claim 17, characterized in that the arrangement for recognizing the need to switch out of the standby-mode comprises an arrangement for recognizing material arriving to be processed.

22. The mineral material processing plant of claim 20, characterized in that the arrangement for recognizing mineral material on the feeder device comprises an arrangement for measuring a surface height of the material on the feeder device.

23. The mineral material processing plant of claim 22, characterized in that the arrangement for measuring the surface height of the material on the feeder device comprises an ultrasound sensor, an optical sensor and/or a radiation sensor.

24. The mineral material processing plant of claim 20, characterized in that the arrangement for recognizing mineral material on the feeder device comprises an arrangement for measuring a tension, force and/or pressure caused to the feeder device by the mineral material.

25. The mineral material processing plant of claim 24, characterized in that the arrangement for measuring the tension, force and/or pressure caused to the feeder device by the mineral material comprises strain gauges, a conveyor scale and/or a pressure sensor.

26. The mineral material processing plant of claim 20, characterized in that the arrangement for recognizing mineral material on the feeder device comprises an arrangement for recognizing mineral material on the feeder device from a video with image based measurement.

27. The mineral material processing plant of claim 21, characterized in that the arrangement for recognizing material arriving to be processed comprises an arrangement for recognizing the proximity to the feeder device of the mineral material processing plant of a machine or of a part of the machine used to bring the mineral material.

28. The mineral material processing plant of claim 27, characterized in that the arrangement for recognizing the proximity to the feeder device of the mineral material processing plant of the machine or of the part of the machine used to bring the mineral material comprises an arrangement for reading an identifier positioned in the machine or in the part of the machine.

29. The mineral material processing plant of claim 28, characterized in that the identifier positioned in the machine or in the part of the machine comprises a radio frequency identification, RFID, identifier.

30. The mineral material processing plant of claim 27, characterized in that the arrangement for recognizing the proximity to the feeder device of the mineral material processing plant of the machine or of the part of the machine used to bring the mineral material comprises a recognition arrangement based on satellite positioning.

31. The mineral material processing plant of claim 27, characterized in that the arrangement for recognizing the proximity to the feeder device of the mineral material processing plant of the machine or of the part of the machine used to bring the mineral material comprises a recognition arrangement with image based measurement from a video image.

32. The mineral material processing plant of claim 21, characterized in that the arrangement for recognizing the proximity to the feeder device of the mineral material processing plant of the machine or of the part of the machine used to bring the mineral material comprises an arrangement for recognizing the material arriving to be processed based on measurement information received from an earlier processing phase.

33. The mineral material processing plant of claim 21, characterized in that the arrangement for recognizing material arriving to be processed comprises an arrangement for recognizing an identifier placed among the mineral material arriving to be processed.

* * * * *